United States Patent [19]

Mieczkowski et al.

[11] Patent Number: 5,250,896
[45] Date of Patent: Oct. 5, 1993

[54] HAND-HELD MAGNETIC CONTACT TACHOMETER WITH TOOTHED ROTATABLE WHEEL

[75] Inventors: Daniel Mieczkowski; Robert J. Holmen; Robert D. Johnson, all of Kenosha; John E. Stanley, Racine, all of Wis.

[73] Assignee: Snap-on Tools Corporation, Kenosha, Wis.

[21] Appl. No.: 729,469

[22] Filed: Jul. 12, 1991

[51] Int. Cl.⁵ .............................................. G01P 3/488
[52] U.S. Cl. ........................................ 324/174; 73/529
[58] Field of Search .............. 324/160, 161, 166, 173, 324/174, 175, 178, 163, 207.11, 207.15, 207.16, 207.22, 207.23, 207.24, 207.25, 378, 379, 377; 73/529, 116, 117.2, 117.3, 488, 489, 518, 527, 519, 517 R

[56] References Cited

U.S. PATENT DOCUMENTS

| | | |
|---|---|---|
| 2,285,006 | 2/1941 | Bowser . |
| 3,273,001 | 9/1966 | Baermann . |
| 3,298,401 | 1/1967 | Stutz .................. 324/174 X |
| 3,351,855 | 11/1967 | Scott . |
| 3,505,596 | 4/1970 | Helm . |
| 3,601,585 | 8/1971 | Paulsen ................... 324/166 X |
| 4,259,637 | 3/1981 | Bloomfield et al. ......... 324/207.25 X |
| 4,295,363 | 10/1981 | Buck et al. . |
| 4,506,339 | 3/1985 | Kuhnlein . |
| 4,539,841 | 10/1985 | Schroeder et al. . |
| 4,691,288 | 9/1987 | Kay et al. . |
| 4,732,034 | 3/1988 | Bjorn . |
| 4,800,378 | 1/1989 | Putrow et al. ............... 324/379 X |
| 4,812,768 | 3/1989 | Quinn ................... 324/379 |
| 4,823,080 | 4/1989 | Lin . |

FOREIGN PATENT DOCUMENTS

| | | |
|---|---|---|
| 1138558 | 10/1962 | Fed. Rep. of Germany ...... 324/206 |
| 1242706 | 7/1986 | U.S.S.R. ................ 324/207.22 |
| 1597613 | 10/1990 | U.S.S.R. ................ 324/209 |

OTHER PUBLICATIONS

Bejczy, "Slip Sensor", *NASA Tech Briefs*, vol 4, No. 3, JPL, Pasadena, Calif, Fall 1979 (no month), p. 422.
Nassimbene, "Direction Sensing of Pen Movement", *IBM-TDB*, vol. 8, No. 10, Mar. 1966, p. 1334.

*Primary Examiner*—Gerard R. Strecker
*Assistant Examiner*—Warren S. Edmonds
*Attorney, Agent, or Firm*—Emrich & Dithmar

[57] ABSTRACT

A hand-held contact tachometer includes an elongated hollow handle comprising two interconnected members defining a clevis at one end thereof and carrying therewithin a magnetic sensor disposed adjacent to the clevis and conditioning circuitry coupled to the output of the sensor. The clevis has hub portions defining an axle on which is rotatably mounted a contact wheel of molded construction including a body of non-magnetic material in which is embedded a toothed magnetic wheel and a bearing. The wheel is provided with a frictional ribbed surface on its outer periphery to facilitate engagement with an associated moving surface, thereby rotating the wheel to generate a pulsating signal having a frequency proportional to the speed of the moving surface.

15 Claims, 2 Drawing Sheets

HAND-HELD MAGNETIC CONTACT TACHOMETER WITH TOOTHED ROTATABLE WHEEL

BACKGROUND OF THE INVENTION

1. Field of the Invention

The present invention relates to devices for detecting the speed of moving surfaces and, in particular, relates to apparatus for sensing variations in the rotational speed of an internal combustion engine.

2. Description of the Prior Art

The present invention is an improvement of the contact tachometer disclosed in copending U.S. application Ser. No. 604,191, filed Oct. 29, 1990 and entitled "Method and Apparatus for Determining Relative Contributions of Individual Cylinders of Internal Combustion Engines Using Contact Tachometer", now U.S. Pat. No. 5,182,512. That tachometer is a hand-held device which includes a hollow handle provided with a clevis at one end rotatably carrying a wheel having a plurality of openings therethrough.

The aforementioned copending application discloses the use of such a contact tachometer in analysis of cylinder power balance, i.e., the relative power contributions of individual cylinders of a multi-cylinder internal combustion engine. This technique takes advantage of the fact that the speed variation of the engine within a single engine cycle can give an indication of the cylinder power balance. Thus, in normal operation, each time a cylinder ignition event occurs, the power stroke of that piston causes the engine to accelerate momentarily. The increase in engine speed reaches a peak and then begins to decrease as the engine "coasts" until the ignition event for the next cylinder in the firing order. Thus, in a normally operating engine, a plot of the engine speed against time over a single engine cycle is in the shape of a generally sinusoidal waveform with one period or cycle of the waveform for each cylinder. If all cylinders are contributing equally to the overall engine power, the peaks of this waveform should all be at substantially the same height.

The contact tachometer disclosed in the aforementioned copending application detects variations in the speed of the engine over a single engine cycle by detecting variations in the speed of a linearly moving part of the engine, such as a fan belt. When the wheel is held against a moving surface of an engine, such as a fan belt or the like, the wheel is rotated, causing the openings to pass between an aligned light source and photocell for producing an alternating output signal, the frequency of which is proportional to the speed of the engine. The handle encloses circuitry which is connected to the photoelectric sensing means for powering it and for generating, in response to its output, a voltage level suitable for being input to an engine analyzer.

But such a photoelectric-type contact tachometer may be subject to inaccuracy or failure if the light source or photoelectric sensor becomes dirty, or if any of the openings in the contact wheel become clogged or partially obscured with dirt, grease or the like. The risk of such inaccuracy or failure is real, since vehicle engine compartments, where the tachometer is intended to be used, are inherently dirty.

It is known to utilize electromagnetic sensors for detecting engine speed variations, such a system being disclosed, for example, in U.S. Pat. No. 4,539,841. In such prior systems, the electromagnetic sensor is positioned adjacent to the teeth on the engine flywheel or ring gear. The sensor senses the passing of the teeth of the ring gear as it is rotated. While this system permits a fairly accurate and reliable indication of engine speed, it has the disadvantage that it requires measurement of the absolute engine speed. Furthermore, the installation of the sensor is very cumbersome and time consuming. The ring gear is relatively inaccessible in most engines and the installation of the magnetic sensor is critical. It must be very precisely positioned relative to the gear teeth and this position must be accurately maintained in order for the system to work properly.

SUMMARY OF THE INVENTION

It is a general object of the present invention to provide an improved apparatus for detecting the speed of a moving surface, which avoids the disadvantages of prior apparatus while affording additional structural and operating advantages.

An important feature of the invention is the provision of an apparatus of the type set forth, which is of relatively simple and economical construction.

Still another feature of the invention is the provision of an apparatus of the type set forth, which provides a reliable and accurate measurement of variations in the speed of the moving surface.

In connection with the foregoing feature, it is another feature of the invention to provide an apparatus of the type set forth, which is not substantially affected by dirt or grime in the working environment.

Another feature of the invention is the provision of an apparatus of the type set forth, which can be used to detect the speed of easily accessible parts of an engine.

In connection with the foregoing feature, another feature of the invention is the provision of an apparatus of the type set forth which is hand-held in use.

These and other features of the invention are attained by providing a hand-held apparatus for detecting the speed of a moving surface comprising: a wheel, handle means supporting the wheel for engagement with the associated moving surface thereby to rotate the wheel about an axis at a speed proportional to the speed of the moving surface, the wheel having a plurality of magnetic portions equiangularly spaced apart about the axis, and magnetic sensing means carried by the handle means and responsive to passage of the magnetic portions for generating a pulsating signal having a frequency proportional to the speed of the associated moving surface.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
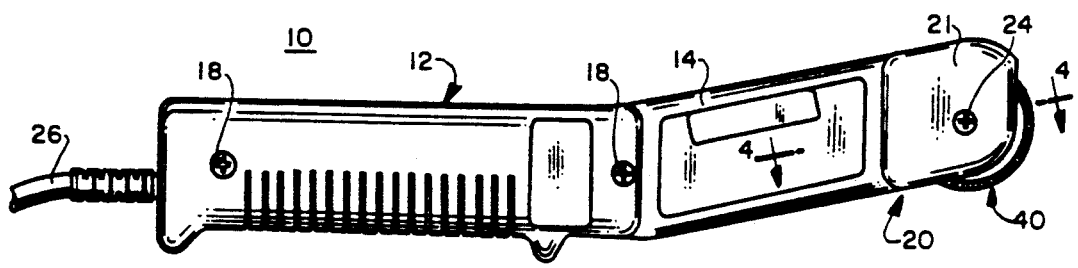
FIG. 1 is a side elevational view of a contact tachometer constructed in accordance with and embodying the features of the present invention.
Figure 2:
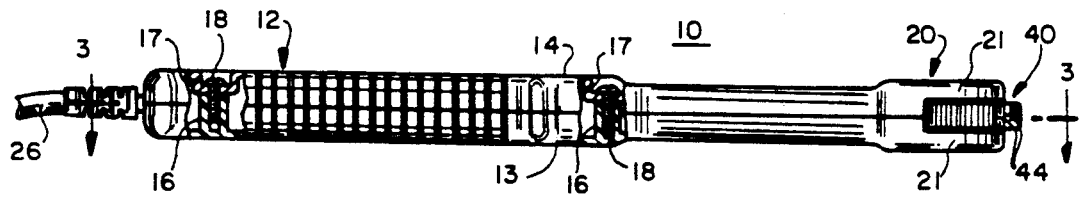
FIG. 2 is a bottom plan view of the tachometer of FIG. 1, with portions broken away to illustrate internal construction.
Figure 3:
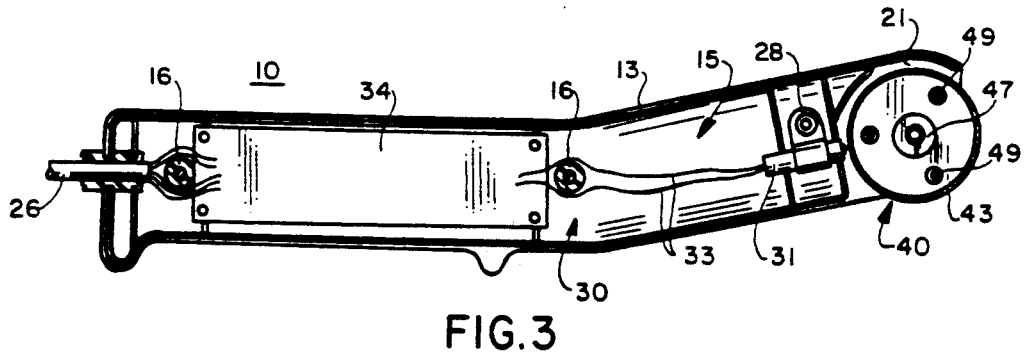
FIG. 3 is a view in vertical section taken along the line 3—3 in FIG. 2.
Figure 4:
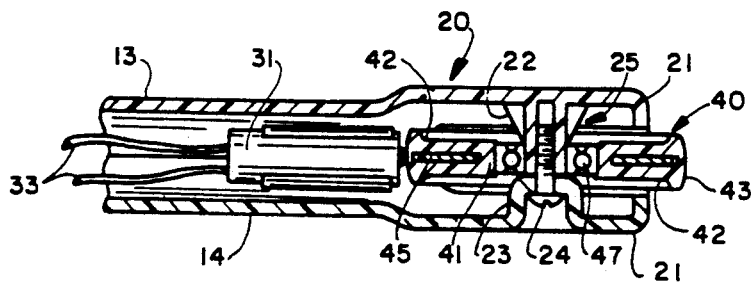
FIG. 4 is an enlarged, fragmentary, sectional view taken along the line 4—4 in FIG. 1.

Referring to FIGS. 1-4 and 8, there is illustrated a contact tachometer, generally designated by the numeral 10, constructed in accordance with and embodying the features of the present invention. The tachometer 10 is adapted to be coupled to an engine analyzer 11, which may be of the type disclosed in U.S. Pat. No. 4,800,378, and includes a microprocessor coupled to a video drive circuit which is, in turn, connected to a CRT oscilloscope, the engine analyzer 11 being adapted for coupling to an associated internal Combustion engine (not shown) to be analyzed (see FIG. 8). The tachometer 10 has an elongated handle 12 which is generally in the shape of a hollow box, substantially rectangular in transverse cross section. The handle 12 is of two-part construction, including a base 13 and a cover 14 which cooperate to define therebetween an enclosed cavity 15. Projecting from the base 13 are longitudinally spaced apart, internally threaded posts 16, which respectively mate with recesses 17 in the cover 14 and are fixedly secured thereto, as by screws 18, for securely holding the handle 12 in an assembled configuration, illustrated in the drawings.

Formed at one end of the handle 12 is a clevis 20 which includes two laterally spaced-apart legs 21, respectively formed on the base 13 and the cover 14. A hub post 22 and a hub recess 23 respectively project laterally inwardly from the legs 21 for abutting engagement with each other, and are fixedly secured together by a screw 24 to define an axle 25. An electrical cord or cable 26 projects from the other end of the handle 12 for connection to the engine analyzer 11 or to other suitable associated equipment.

Figure 9:
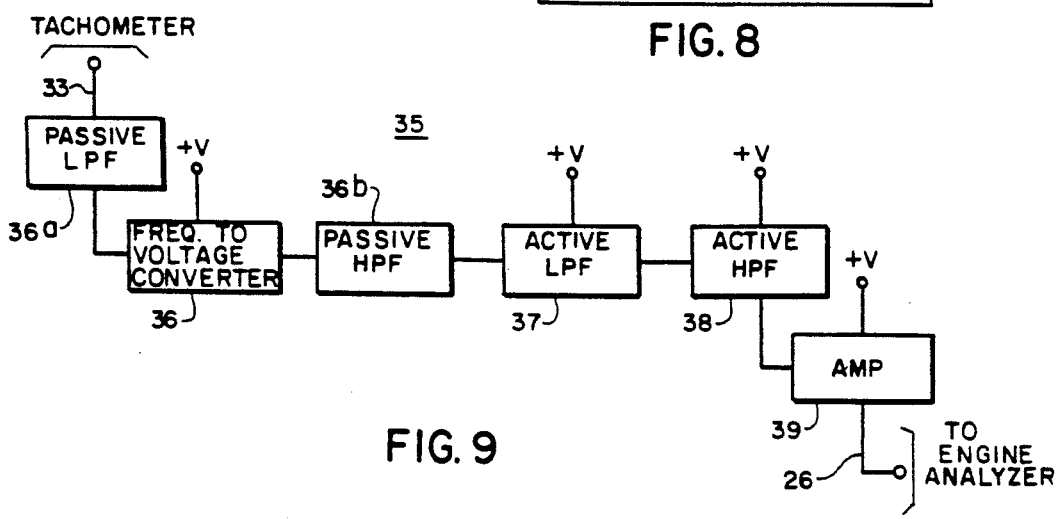
FIG. 9 is a block diagrammatic view of the conditioning circuitry of the contact tachometer of FIG. 1.

Formed in the handle 12 adjacent to the clevis 20 is a mounting 28 for supporting a magnetic sensor 31 of a magnetic sensing assembly 30. The sensor 31 may be a passive sensor of the type manufactured by Electro Corporation under Model No. 3022. Such a sensor typically includes a permanent magnet which produces a magnetic field, in which is disposed an associated coil. The coil has a pair of leads 33 which are connected to suitable conditioning circuitry 35 (see FIG. 9) disposed on a printed circuit board 34 mounted in the cavity 15, and to which the cable 26 is also connected. The circuitry 35 may be generally of the type disclosed in the aforementioned U.S. application Ser. No. 604,191. More specifically, referring to FIG. 9, the circuitry 35 preferably includes an integrated circuit ("IC") frequency-to-voltage converter 36, having an input coupled to the output of the sensor 31 through a passive low pass filter 36(a) for noise elimination, and having an output coupled through a passive high pass filter 36(b) for eliminating DC offsets. The output of the passive high pass filter 36(b) is coupled to the input of an active low pass filter 37, the output of which is in turn coupled through an active high pass filter 38 to an amplifier 39, the output of which is coupled to the engine analyzer 11 through the cable 26. The filters 37 and 38 and the amplifier 39 include operational amplifiers and are provided with a DC supply voltage V+, as is the frequency to voltage converter 36, which voltage may provided by a suitable power supply circuit (not shown) which is powered from the engine analyzer 11 through the cable 26. The filters 37 and 38 cooperate to pass only frequencies between 10 and 40 Hz, which will cover the normal range of engine idle speeds, i.e., from about 600 rpm to about 1200 rpm for engines of from 4 to 8 cylinders.

Figure 5:
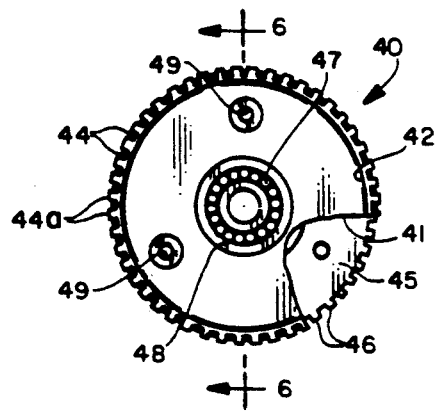
FIG. 5 is an enlarged side elevational view of the contact wheel of the tachometer of FIG. 1, with a portion broken away to illustrate internal construction.
Figure 6:
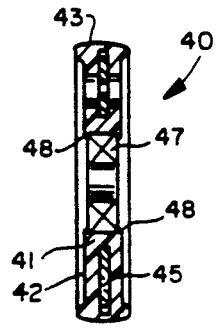
FIG. 6 is a view in vertical section taken along the line 6—6 in FIG. 5.
Figure 7:
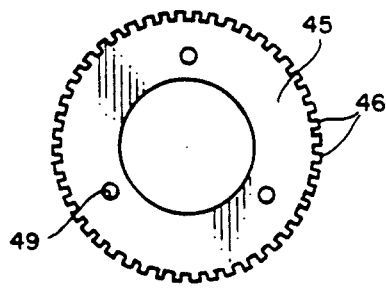
FIG. 7 is a side elevational view of the magnetic ring of the contact wheel of FIG. 5.
Figure 8:
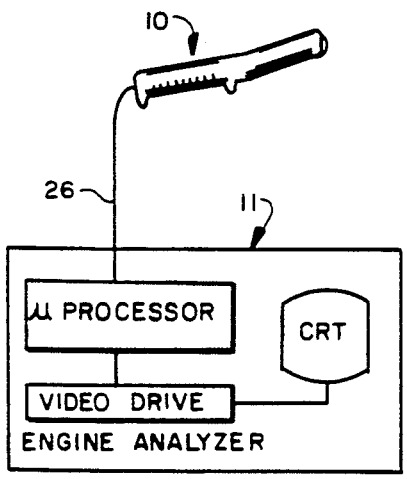
FIG. 8 is a diagrammatic view of the contact tachometer of FIG. 1 coupled to an associated engine analyzer.

Referring now also to FIGS. 5-7, the contact tachometer 10 includes a contact wheel 40 which has an annular body 41 of non-magnetic material, such as a suitable moldable plastic material. The body 41 has shallow annular recesses 42 on the opposite sides thereof and a generally cylindrical outer peripheral surface 43, which is preferably provided with a plurality of equiangularly spaced-apart grooves 44 which cooperate to define alternating ribs 44a to provide a non-slip, frictional surface. The contact wheel 40 includes an annular ring 45 of magnetic material embedded in and completely surrounded by the body 41, the ring 45 having a plurality of peripheral, radially outwardly extending teeth 46, equiangularly spaced apart therearound. An annular bearing 47, such as a ball bearing, is embedded in the body 41 and retained therein by lips 48 and projects radially inwardly therefrom. Preferably, the contact wheel 40 is formed by insert molding, the ring 45 and the bearing 47 being held in an injection mold and the body 41 being molded therearound to produce a compact and rigid integral construction. In this regard, the contact wheel 40 may have a plurality of openings 49 therethrough produced by locating pins in the mold for accurately locating the ring 45 Preferably, the distal ends of the teeth 46 are disposed very close to the outer surface 43 of the wheel 40.

The central opening in the annular bearing 47 is designed to be fitted snugly over the hub post 22 of the base 13 in assembly of the handle 12, the hub recess 23 on the cover 14 serving to laterally retain the contact wheel 40 in place in the clevis 20 when the base 13 and the cover 14 are secured together. Preferably, the parts are so dimensioned that the axis of rotation of the axle 25 is spaced from the sensor 31 a distance very slightly greater than the outer radius of the contact wheel 40. Thus, because of the very thin layer of non-magnetic material covering the distal ends of the teeth 46, the teeth 46 pass very close to the sensor 31 when the contact wheel 40 is rotated.

In operation, the engine analyzer 11 is connected to an associated engine (not shown), such as in the manner illustrated in the aforementioned copending U.S. application Ser. No. 604,191. With the engine idling, the handle 12 of the contact tachometer 10 is manually held by the user and the frictional outer surface 43 of the contact wheel 40 is held against one of the readily accessible, external, linearly moving parts of the engine, such as a fan belt. It will be appreciated that other external moving parts could also be utilized, such as other belts, the harmonic balancer or a pulley. The contact wheel 40 rotates at a speed proportional to the linear speed of the moving engine part with which it is engaged, which latter speed is, in turn, proportional to the speed of the engine.

The permanent magnet of the sensor 31 establishes a magnetic field through which the teeth 46 of the ring 45 pass as the contact wheel 40 is rotated, thereby causing oscillatory perturbations in the magnetic field. These perturbations induce an alternating current in the coil of the sensor 31, which provides an output signal on the leads 33 in the form of a train of pulses with a frequency proportional to the engine speed, i.e., the width of the pulses and the separation between pulses become smaller as the speed increases and larger as the speed decreases. The output signal from the sensor 31 is applied through the low pass filter 36(a) to the frequency-to-voltage converter 36, the output of which is a voltage fluctuation directly related to the change in speed of the moving engine part, with the voltage amplitude being directly proportional to the frequency. This signal is then suitably filtered for display on the CRT screen of the engine analyzer 11 for monitoring fluctuations in the speed of the engine during a single engine cycle and, thereby, determining the relative power contributions of the several engine cylinders.

In a constructional model of the contact tachometer 10, the body 41 of the contact wheel 40 may be formed of a 30% glass-filled nylon, and the ring 45 may be formed of a magnetizable metal, such as a low-carbon steel. The base 13 and the cover 14 of the handle 12 may be molded of a suitable plastic material.

From the foregoing, it can be seen that there has been provided an improved contact tachometer which is of relatively simple and economical construction, providing accurate and reliable measurements of the speed of a moving surface even in a dirty environment, and being capable of hand use in connection with easily accessible engine parts.

We claim:

1. A hand-held apparatus for detecting the speed of a moving surface comprising: a wheel, handle means supporting said wheel with said wheel projecting radially therefrom for engagement with the associated moving surface thereby to rotate said wheel about an axis at a speed proportional to the speed of the moving surface, said wheel having a molded non-magnetic body and a magnetic ring insert molded in and completely surrounded by said body in an integral molded construction, said ring having radially outwardly extending teeth equiangularly spaced apart about said axis, and magnetic sensing means carried by said handle means and responsive to passage of said magnetic teeth for generating a pulsating signal having a frequency proportional to the speed of the associated moving surface.

2. The apparatus of claim 1, wherein said magnetic sensing means includes a passive magnetic sensor.

3. The apparatus of claim 2, wherein said magnetic sensing means includes conditioning circuitry coupled to the output of said magnetic sensor.

4. In a hand-held contact tachometer including an elongated handle having a clevis formed at one end thereof and a contact wheel rotatably mounted in the clevis and projecting radially therefrom for engagement with an associated moving surface to effect rotation of the wheel about an axis, the improvement comprising: magnetic sensing means carried by the handle adjacent to the clevis, the wheel having a molded non-magnetic body and a magnetic ring insert molded in and completely surrounded by said body in an integral molded construction, said ring having radially outwardly extending teeth equiangularly spaced apart about the axis of rotation thereof and disposed for sequentially moving past said magnetic sensing means as the wheel rotates, said magnetic sensing means being responsive to passage of said magnetic teeth for generating a pulsating signal having a frequency proportional to the speed of the moving surface.

5. The contact tachometer of claim 4, wherein the clevis includes a pair of spaced-apart legs, said magnetic sensing means being disposed between said legs at one end thereof.

6. The contact tachometer of claim 4, wherein the handle is hollow, said magnetic sensing means being disposed within the handle.

7. The contact tachometer of claim 6, wherein said magnetic sensing means includes conditioning circuitry disposed within the handle.

8. The contact tachometer of claim 4, wherein the wheel has a generally cylindrical outer surface and frictional gripping means provided on said outer surface.

9. The contact tachometer of claim 4, wherein said frictional gripping means includes a plurality of circumferentially spaced-apart grooves formed in said outer surface.

10. A hand-held magnetic contact tachometer comprising: elongated handle means; axle means carried by said handle means adjacent to one end thereof; a wheel rotatably mounted on said axle means and disposed to project radially from said handle means for engagement with an associated moving surface to effect rotation of said wheel, said wheel including an annular molded body of nonmagnetic material, and a magnetic ring insert molded in said body and surrounded thereby, said ring including a plurality of radially outwardly extending and equiangularly spaced-apart magnetic teeth; and magnetic sensing means carried by said handle means adjacent to said wheel and responsive to passage of said magnetic teeth for generating a pulsating signal having a frequency proportional to the speed of the associated moving surface.

11. The contact tachometer of claim 10, wherein said handle means includes a pair of spaced-apart clevis legs at one end thereof, said wheel being disposed between said clevis legs.

12. The contact tachometer of claim 11, wherein said handle means includes two members releasably secured together, said clevis legs being respectively formed on said members.

13. The contact tachometer of claim 12, wherein said handle means includes hub portions on each of said clevis legs interconnected in use to define said axle means.

14. The contact tachometer of claim 10, and further comprising bearing means carried by said wheel and engageable with said axle means for facilitating rotation of said wheel.

15. The contact tachometer of claim 14, wherein said bearing means is partially embedded in said body and projects radially inwardly therefrom.

* * * * *